H. D. LLOYD.
TRAILER VEHICLE.
APPLICATION FILED APR. 11, 1918.
1,299,973.
Patented Apr. 8, 1919.
2 SHEETS—SHEET 2.
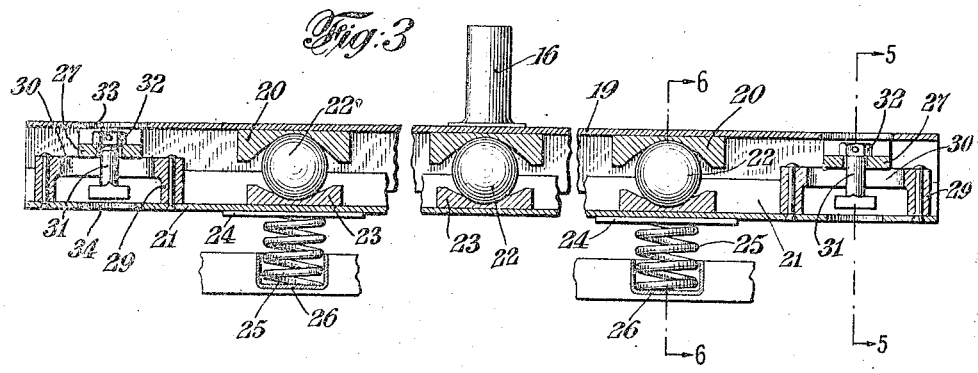
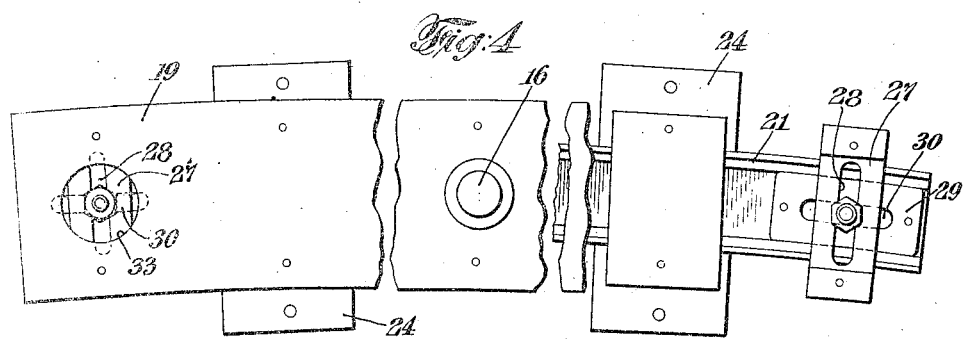
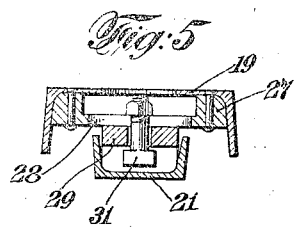
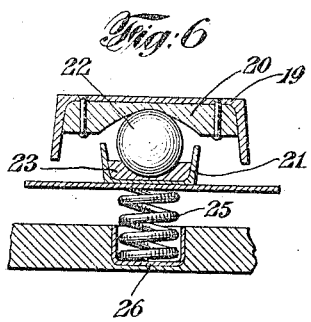
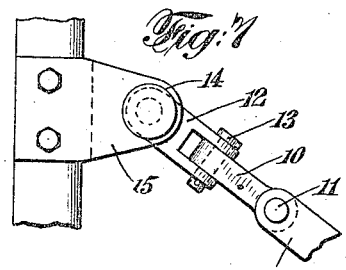
Herbert D. Lloyd INVENTOR
BY
Prindle, Wright & Small ATTORNEYS

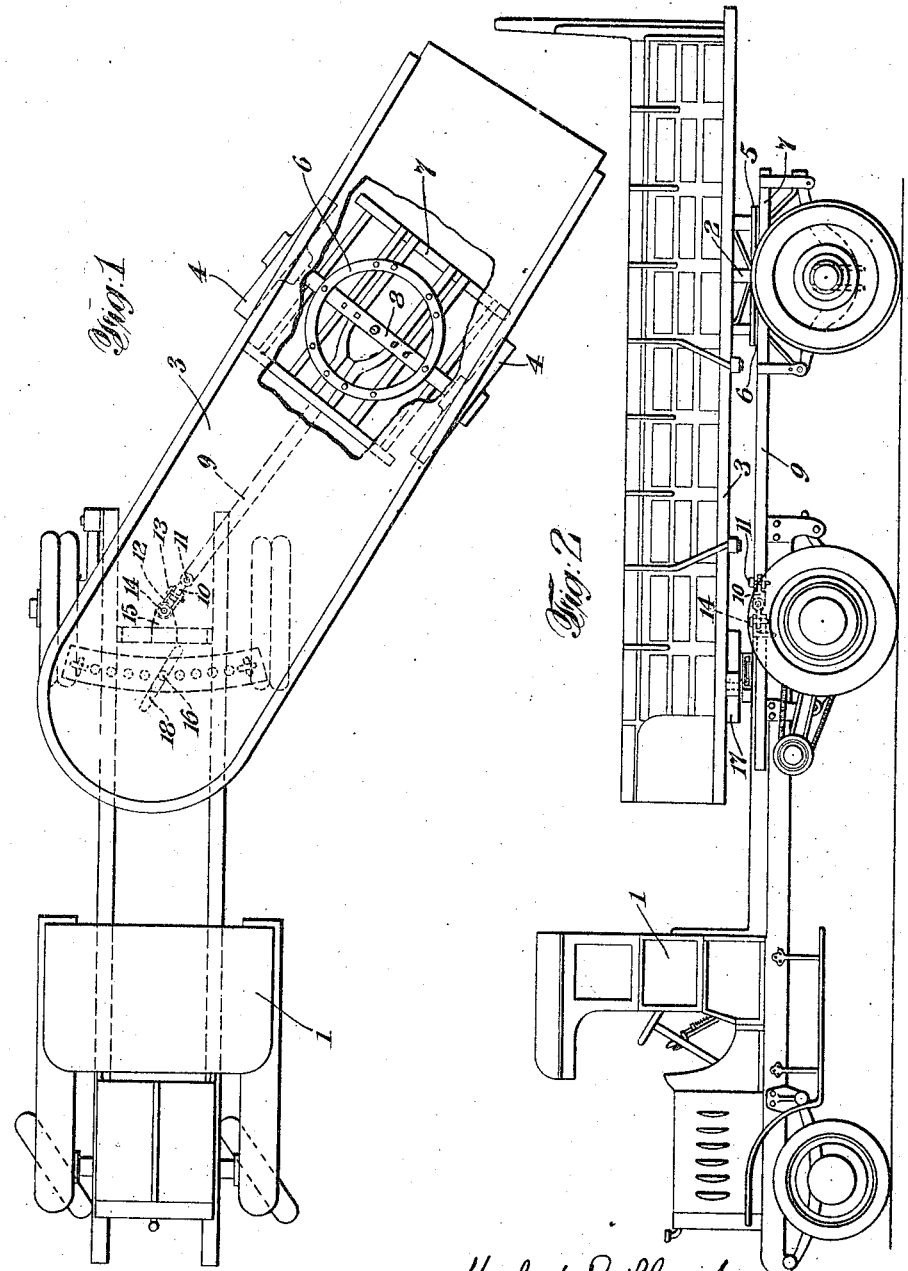

UNITED STATES PATENT OFFICE.

HERBERT D. LLOYD, OF KENT, CONNECTICUT, ASSIGNOR TO TRAILER TRANSPORTATION COMPANY, OF NEW YORK, N. Y., A CORPORATION OF DELAWARE.

TRAILER-VEHICLE.

1,299,973.  Specification of Letters Patent.  Patented Apr. 8, 1919.

Application filed April 11, 1918.  Serial No. 227,878.

*To all whom it may concern:*

Be it known that I, HERBERT D. LLOYD, of Kent, in the county of Litchfield, and in the State of Connecticut, have invented a certain new and useful Improvement in Trailer-Vehicles, and do hereby declare that the following is a full, clear, and exact description thereof.

My invention has for an object to provide a vehicle having a trailer of such character and so connected to the main vehicle as to enable very large loads (with respect to the size and power of the vehicle) to be carried.

Another object of the invention is to so construct the vehicle as to avoid or absorb unusual strains and shocks in the parts thereof such as would occur, for instance, in starting or stopping, or in passing over an uneven road.

A further object of the invention is to provide a vehicle in which the trailer will follow the path of the main vehicle properly both when pursuing straight and curved paths and in which the tendency of the driving wheels to skid is counteracted by the trailer.

Other objects and advantages of the invention will be in part obvious and in part specifically mentioned in the disclosure hereinafter contained, in which I have shown a preferred embodiment of my invention; such embodiment however is to be considered as merely illustrative of the principle thereof.

In the drawings:

Figure 1 is a plan view of a vehicle made according to the principle of my invention, the parts being shown in the position assumed during the operation of turning; a portion of trailer floor is cut away to show the construction of the trailer;

Fig. 2 is a side view of the vehicle;

Fig. 3 is a longitudinal vertical section of the roller bearing sector, which is placed between the main vehicle and the trailer body;

Fig. 4 is a plan view of such sector, a portion of the upper race member being cut away;

Fig. 5 is a section on line 5—5 Fig. 3;

Fig. 6 is a section on line 6—6 Fig. 3; and

Fig 7 is a detail view of the coupling between the draw-bar of the trailer and the frame of the main vehicle.

I have shown in the drawings a main vehicle denoted generally by numeral 1, the specific type of which is not essential to my invention. It may be either a pleasure or commercial car, as the trailer does not require to any extent special modification of the main vehicle. Such vehicle therefore will not be described in detail.

In the present form, I have illustrated a trailer of the two wheeled type consisting of a body portion 2 having a flooring 3, and a pair of wheels 4. It is advantageous to construct the trailer so that its wheels and body portion are angularly movable with regard to each other and for this purpose I have shown a fifth wheel device comprising rings 5 and 6 secured respectively to the body of the trailer 2, and a wheel supporting frame denoted generally by numeral 7. A king bolt 8 extends through a member of the trailer body 2, and also through a member of the wheel supporting frame 7 so as to form a pivot about which the above parts may swing relative to each other. The specific nature of the fifth wheel device will not be described as it is not material to my invention.

In order to pull the trailer I have provided a draw bar 9, which also controls the angular position of the wheels 4 of the trailer. Where angular movement between the trailer wheels and body is provided for by using a fifth wheel device, as in the form illustrated, the rear end of the draw bar may be fastened to the wheel supporting frame so that the latter moves with it. The forward end of the draw bar is so coupled to the main vehicle as to permit relative swinging or pivotal movement between the two, both in a horizontal and a vertical plane. In the embodiment illustrated, this is accomplished by what I term a universal coupling, consisting of a block 10 pivoted to the draw bar 9 by a pin 11, in such a manner as to permit swinging in a horizontal plane and a clevis 12 secured to the block 10 by pin 13, thereby permitting swinging in a vertical plane. The clevis 12 is connected to the main vehicle 1 in any suitable manner, as by a pin 14 extending through a bracket 15 upon frame of the main vehicle 1 and through the clevis. This type of coupling allows a limited amount of longitudinal play between the main vehicle 1 and the trailer.

In order to guide properly the trailer body 2 with respect to the main vehicle 1, I provide a connection between the two such as to permit relative longitudinal movement between them. This may be brought about in a simple manner as shown, by providing a pin and slot connection, which consists of a pin 16 mounted upon a member secured to the main vehicle (in a manner which will be later more fully described) and a block 17 having a slot 18 engaging with the pin 16, the said block being mounted underneath the forward part of the trailer flooring 3 which projects over or extends to the main vehicle 1. The position of the pin and slot connection with respect to the length of the vehicle will be determined according to the sharpness of turning desired to be afforded.

In the present form of the invention, a support or bearing for the forward portion of the trailer flooring 3 is provided at the same point as the connection which permits relative longitudinal sliding. It is desirable to afford a certain amount of lateral sliding motion between the main vehicle and the trailer body 2 when the vehicle is pursuing a curved path, and for this purpose I have provided a device which I term a roller bearing sector. This device in the form shown consists of an upper race member 19 which carries the pin 16 upon its outer surface, and is provided with a plurality of ball receiving concave plates 20 upon its inner surface. As shown in the drawing this race member may conveniently be in the form of a commercial channel iron. A lower race member 21 which may be generally similar to member 19, is mounted under the latter, and balls 22, located between the concave plates 20 and similar plates 23 disposed on the inner surface of the lower race member 21, provide an antifriction bearing between the two race members. The lower race member 21 is secured to the main vehicle 1 in any suitable way, as by means of bolts (not shown) passing through plates 24 which are attached to the lower race member 21, and fastened to the main vehicle. If desirable, the action of the springs on the main vehicle in taking up lateral unevenness in the road may be supplemented by a resilient support for the lower race member 21, such as springs 25 engaging beneath such member and located in recesses 26 in the body of the main vehicle. These springs permit the race members, and therefore the trailer, to tilt laterally with respect to the main vehicle, thereby avoiding the twisting strains which otherwise would occur in passing over humps or holes in the road. In order to permit proper relative movements between the upper and lower race members I provide a connection between the two which permits them to slide relative to each other, preferably both longitudinally and laterally. To accomplish this I have shown U-shaped plates 27 disposed transversely adjacent each end of the upper race member 19, such plates having therein slots 28. Similar U-shaped plates 29 having slots 30 are disposed longitudinally in the lower race member 21 adjacent each end thereof, and headed bolts 31 having nuts 32 are passed through the slots 28 and 30 so as to loosely secure the race members together. Holes 33 and 34 may be provided respectively in the upper and lower race members 19 and 21 to permit insertion and removal of the bolts 31.

In the use of my invention the load carried may be much greater than is possible with ordinary vehicles of the same size and power. This results from the fact that the trailer supports the major portion of the weight so that the driving wheels need bear only sufficient weight to secure the necessary traction, and move the load by pulling it instead of both sustaining and pushing it, as is the case with an ordinary vehicle. The wear on tires and on the road surface is also much decreased owing to the relief of the driving wheels from the load. Furthermore, the commercial rubber tires are not capable of sustaining and driving present trucks of over five tons capacity; by the use of my invention, the capacity of the truck can be increased much above this amount and still permit the use of rubber tires on the main vehicle, since the disposition of the weight does not subject the driving wheels to undue pressure.

In starting and stopping, my type of connection between the trailer and the vehicle proper, performs important functions in relieving the parts of shocks and strains. Sudden jerks on the trailer are avoided in starting, since the lower race member moves forwardly and the upper race member rides up on the balls to a certain extent when the main vehicle begins to move; it yields while still pulling on the trailer to start the latter gradually, until the play in the draw bar is taken up, after which the draw bar takes the pull on the trailer. The reverse of the above action takes place when the vehicle is stopped, thus avoiding the jolt which otherwise would occur.

In turning corners, there is a tendency of the trailer body to slide laterally to a certain extent in the direction toward which the main vehicle is turning. Such movement is permitted to a sufficient extent to relieve sudden strains, by the loose connection between the race members 19 and 21, the ball receiving plates 20 riding up on the balls during the sliding movement. The parts of the roller bearing sector however, always tend to remain in or return to normal or central position, since the concave faces of the plates 20 continually tend to position the balls at the bases of the concavities. Owing to this fact, the trailer automatically returns to its lateral central position whenever the lateral strains thereon are removed. Again, during a turning movement, the trailer body swings (relatively) about pin 16 as a pivot, while the draw bar 9 swings (relatively) about pin 14, with the result that the portion of the trailer which controls the relative angular position of the wheels, has a shorter radius of turning than is the case with the trailer body. The wheels therefore assume a position of greater angularity to the main vehicle than does the trailer body, thus causing the trailer as a whole to track properly and to return more quickly to its normal position directly behind the main vehicle.

During movement of the vehicle, the trailer is locked in position, so to speak, by the three points 8, 14, and 16 which restrain the movement of the trailer so that it maintains proper position with regard to the main vehicle, both during forward movement in a straight or curved path, and in backing. The vehicle can be backed indefinitely without any deviation of the trailer from the path determined by the position of the three above mentioned points, and the steering wheels. Furthermore, in turning corners, the driving wheels are held from lateral movement by the pull exerted upon the main vehicle by the trailer, thus counteracting the tendency of the driving wheels to skid.

While I have described a specific embodiment of my invention it is obvious that many changes may be made without departing from the principle thereof, as defined in the following claims.

I claim:

1. In combination, a main vehicle, a trailer therefor, having a part on its body extending to the main vehicle, engaging members respectively on the main vehicle and the projecting part of the trailer permitting relative longitudinal sliding between the two, and a draw bar comprising a single member located in the line of strain, said member being fixed to a portion of the trailer, and pivotally connected to the main vehicle.

2. In combination, a main vehicle, a trailer therefor having a part connected to its body and extending to the main vehicle, a member connecting said part and said vehicle, and supporting means for said member adapted to permit limited movement thereof in a substantially horizontal plane, and substantially in the direction of any sudden stress applied thereto.

3. In combination, a main vehicle, a trailer therefor having a part connected to its body and extending to the main vehicle, a pin and slot connection between said part and the main vehicle adapted to permit relative lateral swinging and longitudinal sliding between the trailer and vehicle, and a supporting means for one of the elements of said pin and slot connection adapted to permit limited movement thereof in both a longitudinal and lateral direction.

4. In combination, a main vehicle, a trailer therefor having means for permitting relative angular movement between wheels and the body thereof, a part on said trailer body projecting over and having a substantially vertical pivotal connection with the main vehicle, and a draw bar for the trailer pivotally coupled to the main vehicle and controlling the angular position of wheels of the trailer, said draw bar comprising a single member located in the line of strain, said member being rigid with the trailer wheel support, and pivotally connected to the main vehicle.

5. In combination, a main vehicle, a trailer therefor having means permitting relative angular movement between wheels and the body thereof, a part on said trailer body extending to the main vehicle, a pin and slot connection between said part and the main vehicle adapted to permit relative lateral swinging and longitudinal sliding between the trailer and vehicle, a supporting means for one of the elements of said pin and slot connection adapted to permit limited movement thereof in both a longitudinal and lateral direction, and a draw bar for the trailer pivotally coupled to the main vehicle and controlling the angular position of said trailer wheels.

6. In combination, a main vehicle, a trailer therefor having means for permitting relative angular movement between wheels and the body thereof, a part on said trailer body projecting to and having a pivotal connection with the main vehicle, means whereby the trailer body may slide longitudinally relative to the main vehicle, and a draw bar for the trailer pivotally coupled to the main vehicle and controlling the angular position of wheels of the trailer, said draw bar comprising a single member located in the line of strain, said member being rigid with the trailer wheel support, and pivotally connected to the main vehicle.

7. In combination, a main vehicle, a trailer therefor having a part on its body extending to the main vehicle, a member on the main vehicle having a connection with said part permitting relative longitudinal sliding between the two, and anti-friction means permitting lateral sliding between the part and the main vehicle.

8. In combination, a main vehicle, a trailer therefor, engaging members having inclined surfaces, said members being movable respectively with the main vehicle and with the trailer, whereby said inclined surfaces permit a limited amount of longitudinal movement between the main vehicle and the trailer, while still transmitting from one to the other, a portion of forces exerted during such relative longitudinal movement.

9. In combination, a main vehicle, a trailer therefor, members each having a ball receiving recess, said members being movable respectively with the main vehicle and the trailer, and a ball disposed within said recesses, whereby a limited amount of longitudinal movement is permitted between the trailer and main vehicle, and the members transmit a portion of the forces exerted during such relative longitudinal movement.

10. In combination, a main vehicle, a trailer therefor having a part extending to the main vehicle, and an anti-friction bearing between said part and the main vehicle permitting a limited amount of relative lateral sliding therebetween, and means whereby said bearing tends to maintain said part in central position with regard to the longitudinal axis of the vehicle.

11. In combination, a main vehicle, a trailer therefor having a wheel support permitting horizontal swinging between the wheels and body of the trailer, a connection between the trailer body and main vehicle located in the line of strain and permitting lateral swinging of the trailer, and a draw bar comprising a single member located in the line of strain, said member being rigid with said wheel support and pivotally connected to the main vehicle.

12. A trailer having a body portion and means for permitting relative angular movement between such body portion, and wheels of the trailer, a part on said trailer body extending forwardly therefrom, an element of a longitudinal sliding connection located in said part, a draw bar extending forwardly from the trailer and controlling the angular position of wheels thereof, said draw bar comprising a single member located in the line of strain, and rigid with said wheel movement permitting means.

13. A trailer having a body portion and means for permitting relative angular movement between such body and wheels of the trailer, a part on said trailer body extending forwardly therefrom, an element of a pin and slot connection located in said part, a draw bar extending forwardly from the trailer and controlling the angular position of wheels thereof, said draw bar comprising a single member located in the line of strain, and rigid with said wheel movement permitting means.

14. In combination, a main vehicle, a trailer therefor having means for permitting relative angular movement between wheels and the body thereof, a part on said trailer body projecting over and having a pivotal connection with the main vehicle, a draw bar for the trailer pivotally coupled to the main vehicle and controlling the angular position of wheels of the trailer, said draw bar comprising a single member located in the line of strain, and rigid with said wheel movement permitting means, the radius of swing of the draw bar being less than that of the trailer body.

15. In combination, a main vehicle, a trailer therefor having means for permitting relative angular movement between wheels and the body thereof, a part on said trailer body projecting to and having a pivotal connection with the main vehicle, means whereby the trailer body may slide longitudinally relative to the main vehicle, a draw bar for the trailer pivotally coupled to the main vehicle and controlling the angular position of wheels of the trailer, said draw bar comprising a single member located in the line of strain, and rigid with said wheel movement permitting means, the radius of swing of the draw bar being less than that of the trailer body.

16. A trailer bearing comprising a pair of race members having ball receiving recesses therein, balls disposed between said members in said recesses, and securing means for said members permitting relative sliding motion therebetween in the direction of their lengths.

17. A trailer bearing comprising a pair of race members having ball receiving recesses therein, balls disposed between said member in said recesses, and securing means for said members permitting relative sliding motion therebetween transversely of their lengths.

18. A trailer bearing comprising a pair of race members having ball receiving recesses therein, balls disposed between said members in said recesses, and securing means for said members permitting relative sliding motion therebetween both transversely of and in the direction of their lengths.

19. A trailer bearing comprising a pair of race members having ball receiving recesses therein, balls disposed between said members in said recesses, and securing means for said members permitting relative sliding motion therebetween in the direction of their lengths, and means upon one of said race members adapted to engage a part of a trailer.

20. A trailer bearing comprising a pair of race members having ball receiving recesses therein, balls disposed between said members in said recesses, and securing means for said members permitting relative sliding motion therebetween transversely of their lengths, and means upon one of said race members adapted to engage a part of a trailer.

21. A trailer bearing comprising a pair of race members having ball receiving recesses therein, balls disposed between said members in said recesses, and securing means for said members permitting relative sliding motion therebetween both transversely of and in the direction of their lengths, and means upon one of said race members adapted to engage a part of a trailer.

22. A trailer bearing comprising members having anti-friction devices therebetween, securing means for said members permitting relative sliding motion therebetween in the direction of their lengths, and means upon one of said members adapted to engage a part of a trailer.

23. A trailer bearing comprising members having anti-friction devices therebetween, securing means for said members permitting relative sliding motion therebetween transversely of their lengths, and means upon one of said members adapted to engage a part of a trailer.

24. A trailer bearing comprising members having anti-friction devices therebetween, securing means for said members permitting relative sliding motion therebetween, both transversely of and in the direction of their lengths, and means upon one of said members adapted to engage a part of a trailer.

25. In combination, a main vehicle, a trailer therefor having a part extending to the main vehicle, a lateral sliding connection between said part and the main vehicle, and a supporting means for one of the elements of said sliding connection adapted to permit limited movement thereof substantially in the direction of any sudden stress applied thereto but tending to maintain said element in central position with regard to the vehicle.

26. In combination, a main vehicle, a trailer therefor having a part on its body extending to the main vehicle, pin and slot members respectively on said vehicle and trailer permitting relative lateral swinging beween the two, and a yieldable support for one of said members tending to maintain said member in normal position.

In testimony that I claim the foregoing I have hereunto set my hand.

HERBERT D. LLOYD.